United States Patent
Gady

(10) Patent No.: US 8,166,749 B2
(45) Date of Patent: May 1, 2012

(54) EXHAUST TREATMENT DIAGNOSTIC SYSTEM AND METHOD

(75) Inventor: Kevin Andrew Gady, Ypsilanti, MI (US)

(73) Assignee: GM Global Technology Operations LLC

( * ) Notice: Subject to any disclaimer, the term of this patent is extended or adjusted under 35 U.S.C. 154(b) by 572 days.

(21) Appl. No.: 12/378,196

(22) Filed: Feb. 12, 2009

(65) Prior Publication Data

US 2010/0199644 A1    Aug. 12, 2010

(51) Int. Cl.
*F01N 3/00* (2006.01)

(52) U.S. Cl. ............... 60/277; 60/274; 60/285; 60/286; 60/295; 60/301

(58) Field of Classification Search ............ 60/274, 60/277, 284–287, 295–301
See application file for complete search history.

(56) References Cited

U.S. PATENT DOCUMENTS

| | | | | |
|---|---|---|---|---|
| 5,706,652 | A * | 1/1998 | Sultan | 60/274 |
| 5,842,341 | A * | 12/1998 | Kibe | 60/274 |
| 6,363,771 | B1 * | 4/2002 | Liang et al. | 73/23.31 |
| 6,487,852 | B1 * | 12/2002 | Murphy et al. | 60/286 |
| 6,983,589 | B2 * | 1/2006 | Lewis et al. | 60/277 |
| 7,178,328 | B2 * | 2/2007 | Solbrig | 60/286 |
| 7,216,478 | B2 * | 5/2007 | Brown et al. | 60/277 |
| 2007/0068139 | A1 * | 3/2007 | Brown et al. | 60/277 |
| 2008/0022658 | A1 * | 1/2008 | Viola et al. | 60/286 |
| 2008/0178575 | A1 * | 7/2008 | Shaikh et al. | 60/274 |
| 2008/0272926 | A1 | 11/2008 | Ma | |

FOREIGN PATENT DOCUMENTS

| | | |
|---|---|---|
| CN | 1708418 | 12/2005 |
| CN | 101072694 | 11/2007 |

* cited by examiner

*Primary Examiner* — Thomas Denion
*Assistant Examiner* — Jesse Bogue

(57) ABSTRACT

A method and system for monitoring operation of an exhaust treatment system of a diesel engine includes a dosing system for injecting an injection fluid and a temperature sensor generating temperature signals corresponding to exhaust temperatures. A control module determines a temperature change after an injection of injection fluid based on the temperature signals, compares the temperature change to a threshold, and generates a fault signal in response thereto.

21 Claims, 3 Drawing Sheets

EXHAUST TREATMENT DIAGNOSTIC SYSTEM AND METHOD

FIELD

The present disclosure relates to vehicle exhaust systems, and more particularly to diagnosing operation of an exhaust treatment system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

An exhaust treatment system is typically used to reduce vehicle emissions. A control module monitors engine operation and a dosing system selectively injects urea into the exhaust upstream from a catalyst. The treated exhaust reacts with the catalyst. A chemical reaction occurs that heats the catalyst and reduces emissions in the exhaust. More specifically, the chemical reaction decomposes the $NO_x$ and urea into separate elements. $NO_x$ decomposes into nitrogen and water. The urea decomposes into ammonia, which is stored on the surface of the catalyst.

During cold-start periods, the exhaust temperatures are relatively low. $NO_x$ that is formed during the combustion process reacts with the ammonia that was previously stored on the catalyst surface. As a result, ammonium nitrite is deposited on the surface of the catalyst. The formation of ammonium nitrite occurs when ammonia exists on the catalyst surface and exhaust temperatures are below 60 degrees Celsius (60° C.). Ammonium nitrite is stable below 60° C. As the temperature of ammonium nitrite increases above 60° C., the compound decomposes. The decomposition of ammonium nitrite is highly exothermic and tends to increase catalyst temperatures.

The dosing system typically includes a urea supply and an injector. The urea delivered should be based on the level of emissions to effectively treat the exhaust gas. An insufficient treatment of the exhaust gas may be caused by a faulty injector or an insufficient supply of urea.

SUMMARY

Accordingly, the present disclosure provides a diagnostic system for an exhaust treatment system that treats exhaust gas exiting a diesel engine and that includes a dosing system that injects urea or another injection fluid into treat the exhaust gas.

In one aspect of the disclosure, a method for monitoring an exhaust treatment includes generating temperature signals corresponding to exhaust temperatures, injecting injection fluid into the exhaust, determining a temperature change based on the temperature signals, comparing the temperature change to threshold and generating a fault signal in response to comparing.

In another aspect of the disclosure, a system for monitoring operation of an exhaust treatment system of a diesel engine includes a dosing system for injecting an injection fluid and a temperature sensor generating temperature signals corresponding to exhaust temperatures. A control module determines a temperature change after an injection of injection fluid based on the temperature signals and compares the temperature change to a threshold and that generates a fault signal in response thereto.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
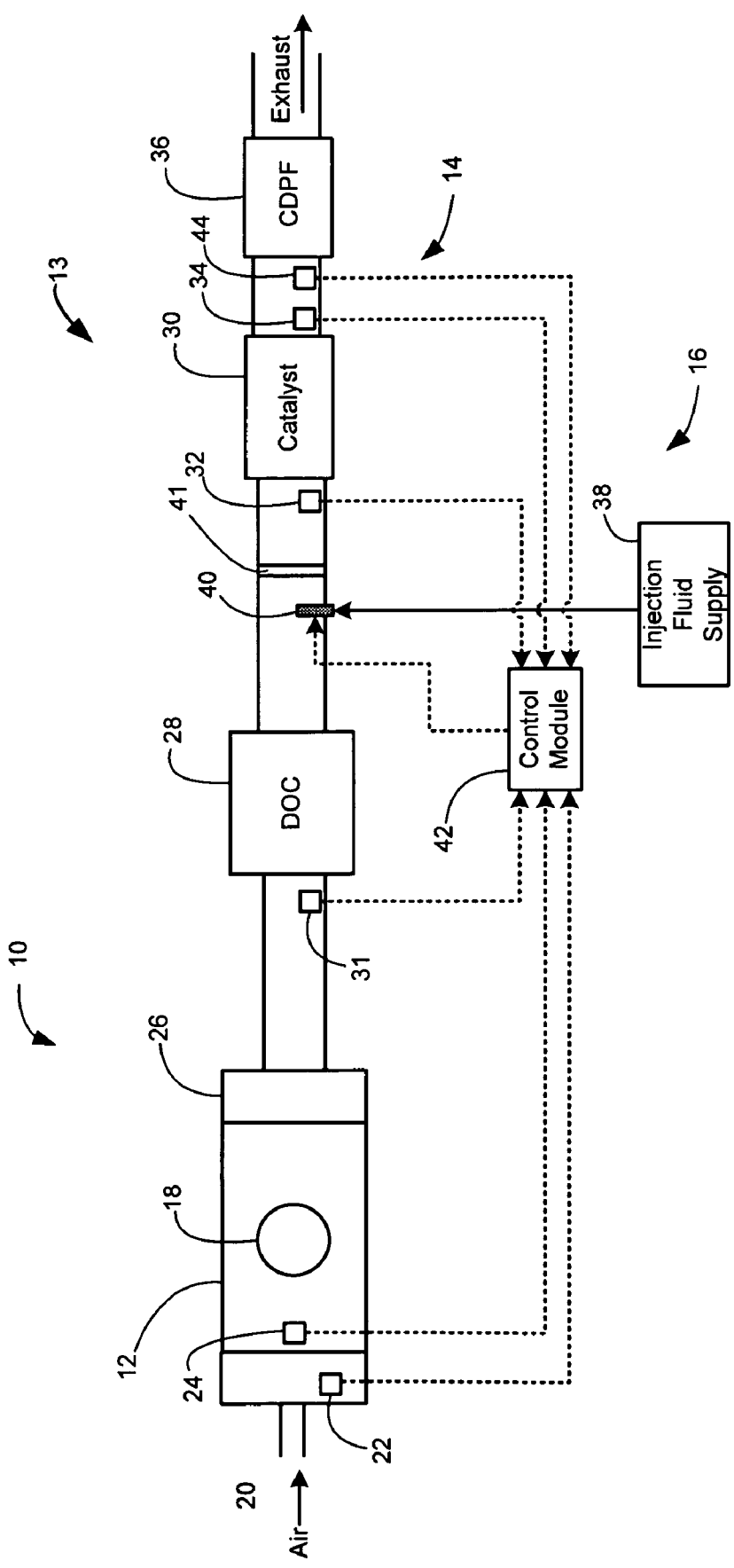
FIG. 1 is a functional block diagram of an engine system including an exhaust treatment system with temperature sensors integrated within a catalyst according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, preferably a selective catalyst reducing (SCR) catalyst, a temperature sensor 31, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 18. The inlet temperature sensor 32 is located prior to the catalyst 30 to monitor the temperature change at the inlet of the catalyst 30, as discussed further below. The outlet temperature sensor 34 is located after the catalyst to monitor the temperature change at the outlet of the catalyst 30, as discussed further below. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates operation of the engine system 10 and monitors operation of the dosing system 16. The control module 42 receives temperature signals from the temperature sensors 31, 32, 34. The control module 42 further monitors operation of the exhaust treatment system 13 based on the change in temperature at the inlet and outlet of the catalyst 30.

The exhaust treatment diagnostic system of the present disclosure determines whether the exhaust treatment system 13 is operating properly based on the temperatures from the temperature sensors.

An exhaust gas emission sensor 44 may generate a signal corresponding to the oxides of nitrogen ($NO_x$) or the amount of oxygen in the exhaust stream.

Figure 2:
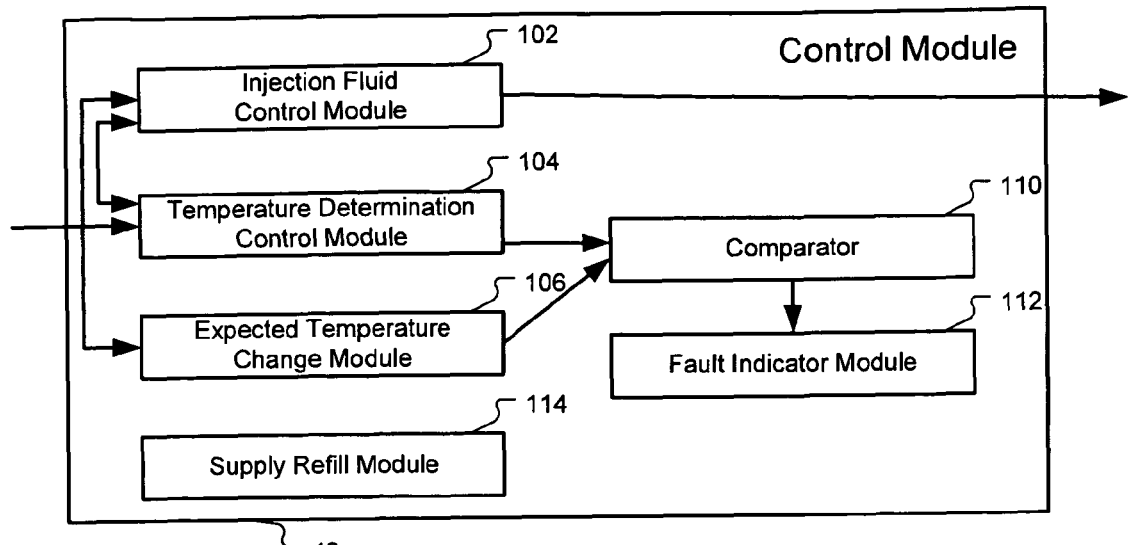
FIG. 2 is a functional block diagram of the controller of FIG. 1.

Referring now to FIG. 2, the control module 42 of FIG. 1 is illustrated in further detail. An injection fluid control module 102 is in communication with a temperature determination module 104. The injection fluid control module 102 controls the injector 140 that is used for injecting fluid into the exhaust. The injection fluid control module 102 may be controlled to inject an injection fluid such as urea into the exhaust stream to reduce the amount of emissions in a diesel engine. The temperature determination module 104 determines various temperatures from different places along the exhaust stream including before the diesel oxidation catalyst, between the diesel oxidation catalyst and a selective catalyst reducing catalyst and after the selective catalyst reducing catalyst but before a catalyzed diesel particulate filter. The temperature determination control module may predict a downstream temperature from an upstream temperature.

An expected temperature change module 106 may receive temperature signals from the temperature determination module and determine an expected temperature change based upon an amount of injected fluid.

The expected temperature change module 106, the temperature determination module 104 and the injection fluid control module 102 may all be in communication with a comparator 110. The comparator 110 may compare an expected temperature change with a temperature difference in order to determine if a fault in the injector or dosing system is present. The comparator 110 may be in communication with a fault indicator module 112 that is used to generate a fault. Operation of the comparator 110 and the fault indicator module 112 will be described further below.

A supply refill module 114 may generate or receive a supply refill signal from a system within the vehicle when the injection fluid supply has been refilled. Instrument panel buttons may be selected to provide this indicator or an automated indicator corresponding to the supply may be provided.

The latent heat of evaporation of injected liquid H2O decreases the exhaust gas temperature. Based upon the following two equations (1), (2) the heat transfer rate of exhaust and the heat transfer rate from water evaporation are set forth. Delta $T_g$ is a predicted change in temperature.

$$\dot{q} = \dot{m}_g \cdot Cp_g \cdot \Delta T_g \qquad (1)$$

$$\dot{q} = \dot{m}_{H20} \cdot Q_{lhv,H20} \qquad (2)$$

During steady state conditions this can be easily approximated by substituting equation (2) into (1) and solving for ΔTg. The gas temperature at a location just after the DOC 28 can be used to approximate the temperature at the temperature sensor 32 using the ΔTg. The deviation of predicted T2 versus measured T2 may be used to diagnose the injection quantity (within accuracy tolerance of prediction).

Another method to diagnose injection quantity may be to shut the injection off, monitor T2, then re-inject a defined amount of liquid. The measured ΔTg should be comparable to the predicted ΔTg after the conditions have reached steady state. When both equations (1) and (2) are solved together, the following formula is obtained:

$$Q_{lhv,UreaSoln} = \frac{\dot{m}_g \cdot Cp_g \cdot \Delta T_g}{\dot{m}_{H20}} \qquad (3)$$

From the above $Q_{lhv}$ is solved by linear regression where the mass rate of exhaust gas ($m_g$) is measured as well as the change in temperature. The mass rate change of water is also measured. $C_p$ is approximated using the properties of air. By forming a predicted temperature change and actually measuring a temperature change, a determination as to the functionality of the injector or the dilution ratio of the injected fluid may be formed as set forth below.

Figure 3:
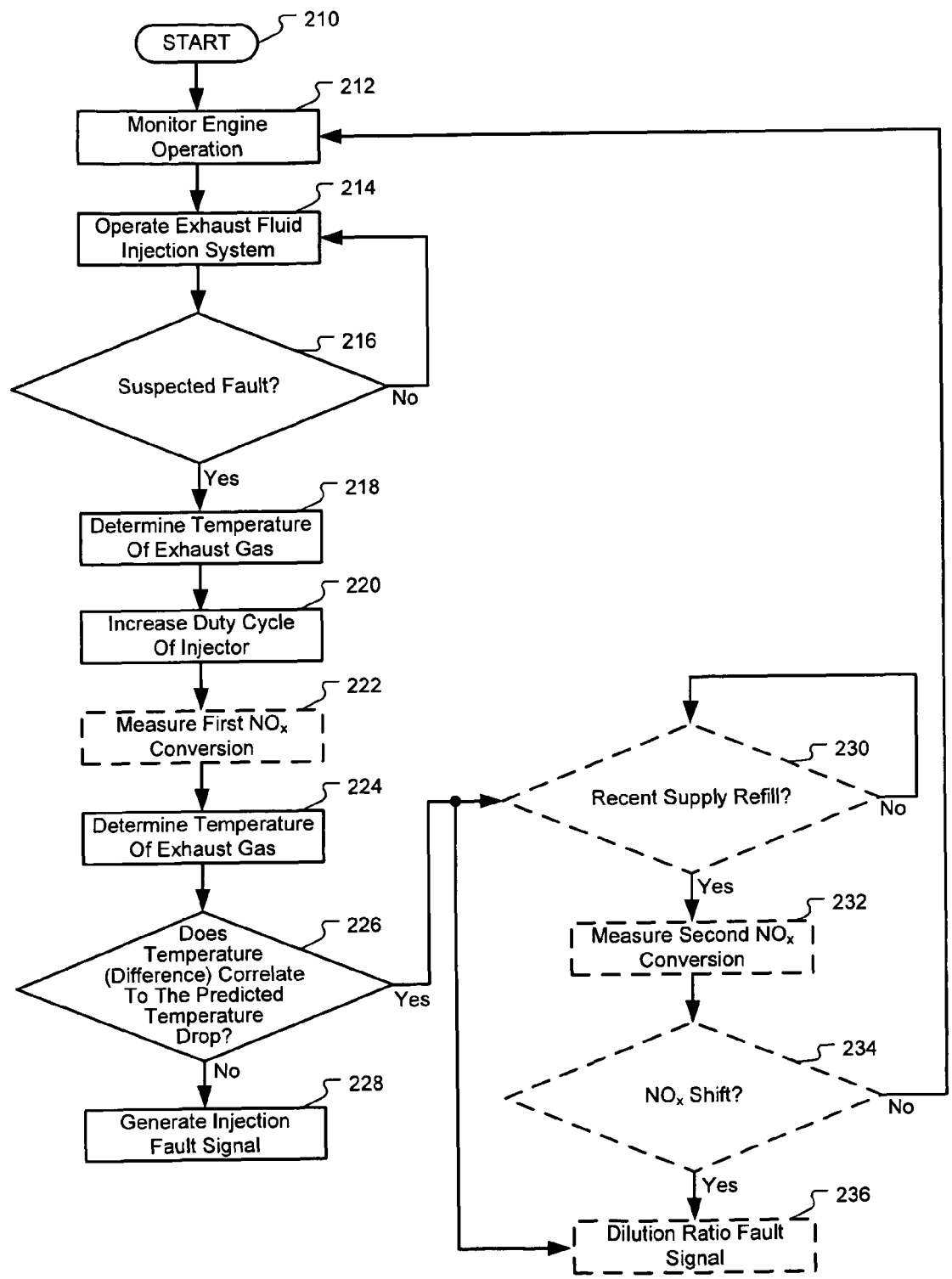
FIG. 3 is a flowchart illustrating steps executed by an exhaust treatment diagnostic system according to the present disclosure.

Referring now to FIG. 3, the method starts in box 210. In step 212, the engine operation is monitored. In step 214, the exhaust fluid injection system is operated to reduce the amount of emissions from the diesel engine. In step 216, if no suspected fault is found, step 212 may again be performed. A suspected fault may be determined in step 216 by looking at various operating conditions or times. Steady state operating conditions may be monitored to determine if a suspected fault may be found. Temperature conditions, as well as various engine parameters, may be measured to determine whether a suspected fault is present. A suspected fault may also be determined after a pre-determined amount of time. That is, a fault may be checked after a certain amount of operating time of the engine. If a suspected fault is found in step 216, step 218 determines a temperature of the exhaust. The temperature of the exhaust may be taken at various locations including temperature sensor 32.

In step 220, the duty cycle of the injector may be increased to inject an additional amount of injection fluid into the exhaust. In step 222, an optional step for measuring the oxides of nitrogen or oxygen may be determined. This optional step will be described further below.

In step 224, a temperature determination of the exhaust gas may be determined. This determination of the exhaust gas temperature is a second exhaust gas temperature. In step 226, it is determined whether or not the temperature corresponds to a predicted temperature. The determination in step 226 may also correspond to a change or drop in temperature. That is, a change in temperature from steps 218 and 224 may be determined and compared to a pre-determined temperature drop or temperature drop threshold. When the temperature from step 224 or the change in temperature does not correspond to a predicted temperature or temperature drop, an injection fault signal may be generated in step 228. This injection fault signal 228 may be an indicator that the fluid injector is faulty.

In one variation of the invention it may be useful to determine whether or not a proper dilution ratio of the fluid or urea is provided. This portion of the method acts together with the first measured $NO_x$ determination in step 222. This portion of the method may take place when the injection quantity is within a range as can be inferred by an alternative determination in step 226.

In step 230, if the urea supply has recently been refilled, the supply refill module 114 illustrated in FIG. 2 may generate a recent supply refill signal. If the supply has not been refilled, the system will continually check for a recent supply refill. In step 232, a second $NO_x$ conversion efficiency may be determined. A first $NO_x$ conversion efficiency is determined in step 222 and a second $NO_x$ conversion efficiency is determined in step 232. If a change or shift above a pre-determined amount is determined in step 234, step 236 generates a dilution ratio fault signal. This is indicative that the dilution ratio of the recently filled tank is not proper. The $NO_x$ shift may be determined in step 234 by comparing or subtracting the first $NO_x$ conversion and the second $NO_x$ conversion and comparing the $NO_x$ conversion to a threshold. Some change in the $NO_x$ conversion may be allowed. The $NO_x$ conversion shift is too high or too low, an error in the amount of dilution of the urea fluid may be determined.

When no $NO_x$ shift or $NO_x$ shift less than a threshold is determined, step 212 may be performed, which again monitors the engine operating conditions.

Figure 4:
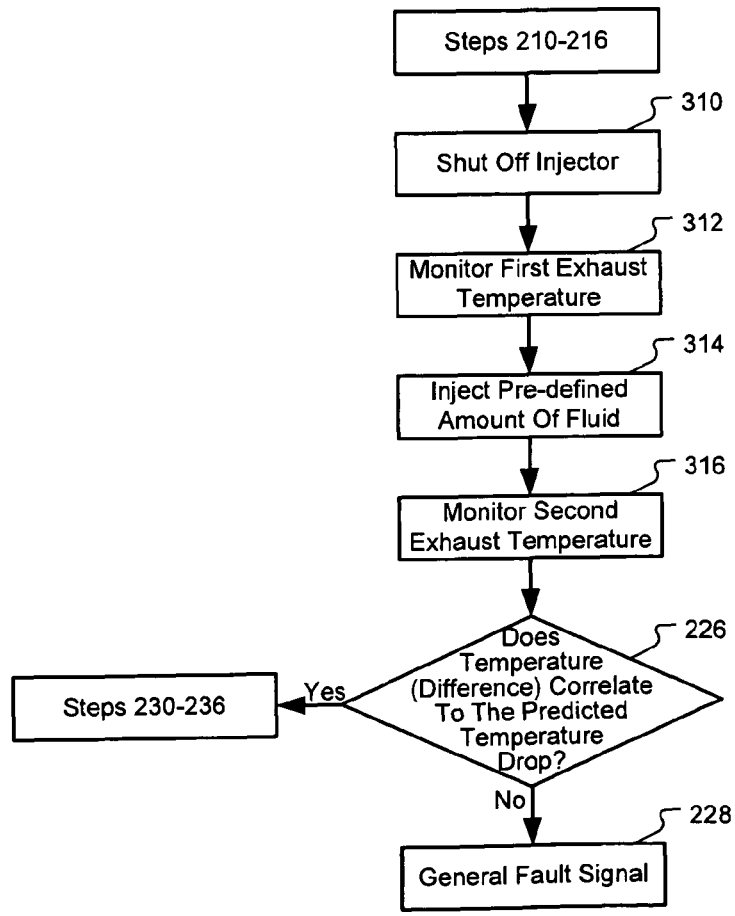
FIG. 4 is a flowchart illustrating steps executed by an exhaust treatment diagnostic system according to an alternative embodiment.

Referring now to FIG. 4, the second method for determining whether a change in temperature corresponds to a predicted change is set forth. Steps 210-216 may be performed prior to this variation. In step 310, the fluid injector is shut off. This prevents urea or other injection fluids from being injected into the system. In step 312, a first exhaust temperature is determined. This may be performed after a wait period. In step 314, a predefined amount of fluid is injected into the exhaust stream. In step 316, a second exhaust temperature is determined. The first exhaust temperature in step 312 and the second exhaust temperature in step 316 may be compared or subtracted after step 316; step 226, 228 and steps 230-236 may be performed as in FIG. 3. That is, in step 226 the temperature difference between steps 312 and 316 may be compared to a predicted temperature drop and, if the temperature drop does not correlate, a fault signal may be generated in step 228. The recent tank refill steps 230-236 may also be performed as described above when the temperature difference does correlate to a temperature drop.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A diagnostic system for monitoring an exhaust system of an engine comprising:
a dosing system including an injector for injecting an injection fluid into exhaust;
a temperature sensor generating temperature signals corresponding to exhaust temperatures; and
a control module that increases a duty cycle of the injector to increase an amount of injection fluid injected from a first amount that is greater than zero to a second amount that is greater than the first amount, that determines a temperature change based on the temperature signals, that compares the temperature change to a threshold, and that generates an injection fault signal in response to comparing the temperature change to the threshold.

2. A diagnostic system as recited in claim 1 wherein the dosing system includes a urea supply supplying urea and the injector supplies said urea into said exhaust system.

3. A diagnostic system as recited in claim 2 wherein the injector is disposed between a diesel oxidation catalyst and a selective catalyst reducing catalyst.

4. A diagnostic system as recited in claim 2 wherein the injection fault signal corresponds to a fault of the injector.

5. A diagnostic system as recited in claim 1 wherein said temperature sensor corresponds to an inlet temperature of a catalyst.

6. A diagnostic system as recited in claim 1 wherein the control module determines a first $NO_x$ conversion efficiency before a supply of the injection fluid is refilled, the control module receives a refill signal indicating that the supply of the injection fluid is refilled, the control module determines a second $NO_x$ conversion efficiency after the supply of the injection fluid is refilled, the control module compares the first $NO_x$ conversion efficiency and the second $NO_x$ conversion efficiency to determine a $NO_x$ shift, and in response to comparing the first $NO_x$ conversion efficiency and the second $NO_x$ conversion efficiency, the control module generates a dilution ratio fault signal.

7. A diagnostic system as recited in claim 6 wherein the dilution ratio fault signal corresponds to an improper dilution amount of the injection fluid.

8. A diagnostic system as recited in claim 1 wherein the threshold corresponds to a predicted reduced temperature.

9. A diagnostic system as recited in claim 1 wherein the control module determines a first temperature based on the temperature signals prior to controlling the injector to inject a predefined amount of the injection fluid into the exhaust system, the control module determines a second temperature based on the temperature signals after controlling the injector to inject the predefined amount of the injection fluid into the exhaust system, and the control module determines the temperature change based on a difference between the first temperature and the second temperature.

10. A diagnostic system as recited in claim 1 wherein the temperature sensor is upstream of the dosing system and the control module determines a predicted temperature downstream of the dosing system based on the temperature signals.

11. A diagnostic system as recited in claim 1, wherein the threshold includes a predetermined range and the control module generates the injection fault signal when the temperature change is outside of the predetermined range.

12. A method of monitoring operation of an exhaust treatment system of an exhaust of a diesel engine, comprising:
generating temperature signals corresponding to exhaust temperatures;
injecting injection fluid into the exhaust using an injector;
increasing a duty cycle of the injector to increase an amount of injection fluid injected from a first amount that is greater than zero to a second amount that is greater than the first amount;
determining a temperature change based on the temperature signals;
comparing the temperature change to a threshold; and
generating an injection fault signal in response to comparing the temperature change to the threshold.

13. A method as recited in claim 12 wherein injecting injection fluid into the exhaust comprises injecting urea through the injector.

14. A method as recited in claim 13 wherein the injector is disposed between a diesel oxidation catalyst and a selective catalyst reducing catalyst.

15. A method as recited in claim 12 wherein the injection fault signal corresponds to a fault of the injector.

16. A method as recited in claim 12 wherein generating temperature signals corresponding to exhaust temperatures comprises generating temperature signals corresponding to an inlet temperature of a catalyst.

17. A method as recited in claim 12 further comprising:
determining a first $NO_x$ conversion efficiency before a supply of injection fluid is refilled
receiving a refill signal indicating that the supply of injection fluid is refilled;
determining a second $NO_x$ conversion efficiency after the supply of injection fluid is refilled;
comparing the first $NO_x$ conversion efficiency and the second $NO_x$ conversion efficiency to determine a $NO_x$ shift; and
generating a dilution ratio fault signal in response to comparing the first $NO_x$ conversion efficiency and the second $NO_x$ conversion efficiency.

18. A method as recited in claim 17 wherein the dilution ratio fault signal corresponds to an improper dilution amount of the injection fluid.

19. A method as recited in claim 17 wherein comparing the first conversion efficiency to the second conversion efficiency comprises comparing the first conversion efficiency to the second conversion efficiency when an injection quantity is within a predetermined range.

20. A method as recited in claim 12 wherein the temperature signals indicate an upstream temperature upstream of a dosing system, the method further comprising predicting a downstream temperature downstream of the dosing system based on the temperature signals.

21. A method as recited in claim 12, wherein the threshold includes a predetermined range, the method further comprising generating the injection fault signal when the temperature change is outside of the predetermined range.

* * * * *